(No Model.)
F. & O. KAMPFE.
TWINE AND THREAD CUTTER.
No. 248,756. Patented Oct. 25, 1881.
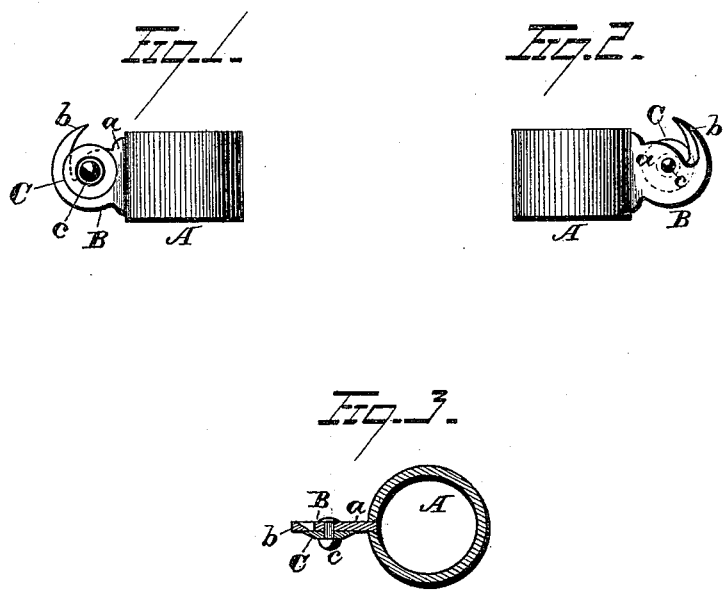

United States Patent Office.

FREDERICK KAMPFE AND OTTO KAMPFE, OF NEW YORK, N. Y.

TWINE AND THREAD CUTTER.

SPECIFICATION forming part of Letters Patent No. 248,756, dated October 25, 1881.

Application filed April 15, 1881. (No model.)

*To all whom it may concern:*

Be it known that we, FREDERICK KAMPFE and OTTO KAMPFE, of New York, in the county of New York and State of New York, have invented certain new and useful Improvements in Twine and Thread Cutters; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

Our invention relates to an improvement in twine or thread cutters, the object of the same being to furnish a simple and cheap device that can be secured on the user's hand to cut thread and twine; and it consists in a finger-ring having a fixed hook-shaped cutter rigidly secured to the ring, and a revolving cutter journaled upon the fixed cutter, the cutting-edge of the revolving cutter being arranged to engage with the cutting-edge of the fixed cutter.

In the accompanying drawings, Figure 1 is a side view, showing the revolving cutter. Fig. 2 is a view of the opposite side, and Fig. 3 is a transverse section.

A represents a finger-ring having a fixed cutter, B, rigidly secured thereto, either by riveting or otherwise. This fixed cutter B consists of a shank, $a$, and a hooked end or blade, $b$, the latter serving to direct the cord to the revolving cutter, and also assisting in cutting the same.

The revolving cutter C is preferably made of steel, and of smaller diameter than the shank $a$ of the fixed cutter, to which it is secured with its flat side held up snugly against the said fixed cutter by the pivot-screw $c$. By making the revolving cutter of less diameter than the fixed cutter the cutting-edge of the said cutter is protected, and it also prevents the users from accidentally cutting themselves, the only projecting portion of the same being at the space between the blade $b$ and shank $a$, where the cord is carried to be cut. The advantage of this cutter is that the cutting-wheel C revolves every time a cut is made, thereby presenting a new cutting-edge every time a cord is severed, whereas the cutters ordinarily used are stationary, which by continuous use wear out; but in this the pressure of the cord is sufficient to turn the wheel, and there is consequently a sharp edge always presented.

In using the improved cutter it is simply necessary to put the ring on the finger with the hook or blade of the fixed cutter pointing toward the wearer, and moving the hand so as to bring the cord under the hook, then by slightly pulling on the cord or moving the hand containing the ring toward you the cord is severed.

Instead of using our improvement on finger-rings, as above described, they may be applied to thimbles, and the revolving and fixed cutters can be made smaller to suit lighter work.

The fixed cutter B can be made of the same material as the ring and constructed in the same piece therewith, if desired; but we do not limit ourselves to any material, as the ring can be constructed of rubber, which will answer all purposes and at the same time adapt itself to all sizes of fingers.

We are aware that revolving cutters are old, and that a revolving cutter has been combined with a fixed cutter in pruning implements, and hence we would have it understood that we make no broad claim to such parts.

In our improvement the fixed cutter consists of a comparatively wide plate which is rigidly secured to the ring. The revolving cutter is journaled upon a pin or stud attached to the wide shank of the fixed cutter, whereby the entire casing-edge of the revolving cutter is shielded and protected from injury by the shank and hook portion of the fixed cutter.

Having fully described our invention, what we claim as new, and desire to secure by Letters Patent, is—

As a new article of manufacture, a twine and thread cutter consisting of a finger-ring having a fixed hook-shaped cutter rigidly secured thereto and a revolving cutter journaled upon the fixed cutter, the shank portion of the fixed cutter being made of greater width than the diameter of the revolving cutter, whereby the cutting-edge of the latter is shielded and protected from injury, substantially as set forth.

In testimony that we claim the foregoing we have hereunto set our hands and seals this 8th day of April, 1881.

FREDERICK KAMPFE. [L. S.]
OTTO KAMPFE. [L. S.]

Witnesses:
CHAS. FULLER,
RICHARD KAMPFE.